(12) United States Patent
Vissiere et al.

(10) Patent No.: US 10,996,059 B2
(45) Date of Patent: May 4, 2021

(54) METHOD FOR ESTIMATING THE MOVEMENT OF AN OBJECT MOVING IN AN ENVIRONMENT AND A MAGNETIC FIELD

(71) Applicant: SYSNAV, Vernon (FR)

(72) Inventors: David Vissiere, Paris (FR); Mathieu Hillion, Vernon (FR); David Caruso, Paris (FR)

(73) Assignee: SYSNAV, Vernon (FR)

(*) Notice: Subject to any disclaimer, the term of this patent is extended or adjusted under 35 U.S.C. 154(b) by 0 days.

(21) Appl. No.: 16/632,422

(22) PCT Filed: Jul. 19, 2018

(86) PCT No.: PCT/FR2018/051836
§ 371 (c)(1),
(2) Date: Jan. 20, 2020

(87) PCT Pub. No.: WO2019/016473
PCT Pub. Date: Jan. 24, 2019

(65) Prior Publication Data
US 2020/0208981 A1 Jul. 2, 2020

(30) Foreign Application Priority Data
Jul. 21, 2017 (FR) ...................... 1756986

(51) Int. Cl.
*G01C 21/16* (2006.01)
*G06T 7/277* (2017.01)

(52) U.S. Cl.
CPC ............ *G01C 21/165* (2013.01); *G06T 7/277* (2017.01)

(58) Field of Classification Search
CPC .............................. G10C 21/165; G06T 7/277
See application file for complete search history.

(56) References Cited

U.S. PATENT DOCUMENTS

| 8,065,074 B1* | 11/2011 | Liccardo | G01C 21/165 |
| | | | 701/480 |
| 8,761,439 B1* | 6/2014 | Kumar | G06T 7/73 |
| | | | 382/103 |
| 2017/0074660 A1* | 3/2017 | Gann | F41G 7/008 |

FOREIGN PATENT DOCUMENTS

| CN | 106709222 A | 5/2017 |
| EP | 2541199 A1 | 1/2013 |

(Continued)

OTHER PUBLICATIONS

International Preliminary Report on Patentability received for PCT Patent Application No. PCT/FR2018/051836, dated Jan. 30, 2020, 20 pages (9 pages of English Translation and 11 pages of Original Document).

(Continued)

*Primary Examiner* — Girumsew Wendmagegn
(74) *Attorney, Agent, or Firm* — Womble Bond Dickinson (US) LLP

(57) ABSTRACT

The present invention relates to a method for estimating the movement of an object (1) moving in an environment (Σ) and an ambient magnetic field, the method being characterised in that it includes the steps of:
(a) Acquisition:
by inertial measurement means (24) fixed with respect to said object (1), of at least one component of an acceleration and/or an angular velocity of the object (1), designated inertial datum;
by magnetic measurement means (20) fixed with respect to said object (1), of at least one component of the magnetic field and/or an i-th derivative of the magnetic field, at the magnetic measurement means (20), designated magnetic datum;
by optical acquisition means (26) fixed with respect to said object (1), of consecutive images of the environment (Σ), designated vision datum;

(Continued)

(b) Estimation by the data processing means (21, 31, 41) of at least one component of the movement of said object (1) using the inertial datum, as well as the magnetic datum and/or the vision datum.

13 Claims, 3 Drawing Sheets

(56) References Cited

FOREIGN PATENT DOCUMENTS

| | | |
|---|---|---|
| FR | 2914739 A1 | 10/2008 |
| FR | 3069316 A1 | 1/2019 |
| WO | 2011/147947 A1 | 12/2011 |

OTHER PUBLICATIONS

International Search Report and Written Opinion received for PCT Patent Application No. PCT/FR2018/051836, dated Oct. 10, 2018, 24 pages (10 pages of English Translation and 14 pages of Original Document).

\* cited by examiner

METHOD FOR ESTIMATING THE MOVEMENT OF AN OBJECT MOVING IN AN ENVIRONMENT AND A MAGNETIC FIELD

GENERAL TECHNICAL FIELD

The present invention relates to the field of navigation without GPS.

More precisely, it relates to a method for estimating the movement of an object by magneto-vision-inertial techniques.

PRIOR ART

So-called vision-inertial navigation techniques or VINS (vision-aided inertial navigation systems) make it possible to estimate precisely the velocity (and therefrom, by integration, the position) of a solid in an environment considered static.

Precisely, as a complement to the equations already used in conventional inertial techniques, successively acquired images of the environment are compared to estimate the (linear) velocity vector V, from the angular velocity vector 12 (generally measured by gyrometers of the inertial unit). It is also possible to acquire from the static environment images of the solid for the same result.

Thanks to this information on the velocity of the solid, the error on the estimation of position will be in the worst of cases proportional to time, unlike conventional inertial techniques where it is quadratic in time.

These vision-inertial techniques thus provide satisfaction, and require inertial sensors of lower performance than conventional inertial methods (based on integration through a Kalman filter or another observer of information coming from gyrometers and accelerometers embedded on the solid of which it is wished to estimate the position and the velocity: typically, the gyrometers "maintain" a frame of reference, in which a double temporal integration of the measurements of the accelerometers makes it possible to estimate the movement) and are thus less bulky.

Thus, at least one inertial unit is coupled to at least one camera which is fixed with respect to the inertial unit. The data derived from these sensors are transmitted to the electronic acquisition and calculation card which delivers position and velocity information to the user by resolution of the system of equations.

However, it is today observed that VINS suffers from two defects:

they have high electricity consumption. Indeed, whereas the consumption of standard inertial sensors of MEMS type is derisory, it has been shown that the electricity consumption of a camera and especially that of the processors needed to process the images is virtually two orders of magnitude greater (see the document 'Vision-inertial Odometry on Chip: An Algorithm-and-Hardware Co-design Approach". Zhengdong Zhang, Amr Suleiman, Luca Carlone, Vivienne Sze, Sertac Karaman, 2017). It is thus recognised that around 10 Watts of power are necessary to operate the system on a CPU architecture, which is problematic if the system is battery supplied.

they have need of easily differentiable images of the environment, which means that they are often used in drones which are generally equipped as standard with a camera and move about in an external environment (designated "outdoors", typically natural or urban) which has lit and varied landscapes, but they can become virtually inoperative in interior environments (designated "indoors"), in which situations are encountered such as a dark tunnel or a room with walls having little texture. In addition, the reaction of the system confronted with such a situation is to increase the gain of the camera, which increases the noise in the image. Alternatively, it is possible to provide a camera of better quality (more sensitive to light), which in addition to being significantly bulkier (sensor and lens size), consumes more than a downmarket camera. Similarly, in the case of systems where the camera is fixed in the environment, it is possible to have an obstacle which hides the target solid.

Moreover, these systems are based, to various degrees, on the hypothesis of a field of view mainly intersecting a static part of the world, which may be temporarily false if the scene is dynamic. If purely vision methods may be found to segment stationary zones from dynamic zones in the image, said methods, computationally intensive, also tend towards an increase in consumption.

To resolve the problem of consumption, it is possible to change the hardware support, notably by carrying out the heavy computations on a FPGA or by setting up an ASIC or even a specialised processor (see for example the "HPU" of Microsoft), which remains very expensive.

Alternatively, it has been proposed to find a compromise between performance and consumption, for example by reducing the resolution of the acquired image, its quality (use of a monochrome camera) or the acquisition frequency. Such a solution further degrades the performances in the problematic cases cited above.

It would be desirable to have available a new vision-inertial navigation method which substantially decreases electricity consumption, while improving performances, in particular in difficult environments such as indoors.

DESCRIPTION OF THE INVENTION

The present invention thereby relates, according to a first alternative of a first aspect, to a method for estimating the movement of an object moving in an environment and an ambient magnetic field, the method being characterised in that it includes the steps of:

(a) Acquisition:
  by inertial measurement means fixed with reference to said object, of at least one component of an acceleration and/or an angular velocity of the object, designated inertial datum;
  by magnetic measurement means integral with said object, of at least one component of the magnetic field and/or an i-th derivative of the magnetic field, at the magnetic measurement means, designated magnetic datum;
  by optical acquisition means fixed with reference to said object, of consecutive images of the environment, designated vision datum;
(b) Estimation by the data processing means of at least one component of the movement of said object using the inertial datum, as well as the magnetic datum and/or the vision datum.

The present invention relates, according to a second alternative of the first aspect, to a method for estimating the movement of an object moving in an environment and an ambient magnetic field, the method being characterised in that it includes the steps of:

(a) Acquisition:
   by inertial measurement means fixed with reference to said object, of at least one component of an acceleration and/or an angular velocity of the object, designated inertial datum;
   by magnetic measurement means fixed with reference to said object, of at least one component of the magnetic field and/or an i-th derivative of the magnetic field, at the magnetic measurement means, designated magnetic datum;
   by optical acquisition means fixed with reference to the environment, of consecutive images of said object, designated vision datum;
(b) Estimation by the data processing means of at least one component of the movement of said object using the inertial datum, as well as the magnetic datum and/or the vision datum.

According to other advantageous and non-limiting characteristics:
   step (a) includes the selection of the magnetic datum and/or the vision datum, the data used in step (b) in excess of the inertial datum being the selected datum or data;
   step (a) includes the evaluation of the validity of the magnetic datum and/or the vision datum, the selection of the magnetic datum and/or the vision datum being a function of the result of said validity evaluation;
   one of the magnetic datum and the vision datum is a default datum and the other a resetting datum, the evaluation of the validity being implemented for the default datum, and the selected datum being:
      the default datum if the default datum is evaluated valid,
      the resetting datum if the default datum is not evaluated valid.
   the evaluation of the validity of the magnetic datum and/or the vision datum includes the evaluation of an uncertainty in the estimation of the movement;
   the evaluation of the validity of the magnetic datum includes the evaluation of the stationarity of the ambient magnetic field, or the evaluation of the non-uniformity of the gradient;
   the evaluation of the validity of the vision datum includes the evaluation of the number of points of interest, the evaluation of the light intensity, the evaluation of an indicator of the image contrast, or the evaluation of the success of the detection of the object in the image in the case where the optical acquisition means are fixed with reference to the environment;
   step (b) includes in a preferred manner a first sub-step (b1) of constructing elements for the environment using the inertial datum as well as the magnetic datum and/or the vision datum, and a second sub-step (b2) of estimating the at least one component of the movement of the object from said mapping elements;
   the first sub-step (b1) of constructing elements for mapping the environment using the inertial datum as well as the magnetic datum and/or the vision datum includes a first rough construction of elements for mapping the environment using the inertial datum as well as the magnetic datum, then refining the elements for mapping the environment using the vision datum;
   step (a) includes the prior calibration of one among the inertial measurement means, the magnetic measurement means and the optical acquisition means, with the data acquired by the two others.

According to a second aspect, the invention relates to an equipment for estimating the movement of an object moving in an environment and an ambient magnetic field, characterised in that it includes data processing means configured to implement:
   A module for receiving:
      at least one component of an acceleration and/or an angular velocity of the object, designated inertial datum, acquired by inertial measurement means integral with said object;
      at least one component of the magnetic field and/or an i-th derivative of the magnetic field, designated magnetic datum, by magnetic measurement means fixed with reference to said object;
      consecutive images of the environment or the object, designated vision datum, by optical acquisition means respectively fixed with reference to said object or the environment;
   A module for estimating at least one component of the movement of said object using the inertial datum, as well as the magnetic datum and/or the vision datum.

According to other advantageous and non-limiting characteristics:
   The equipment is a case including the magnetic measurement means and/or the inertial measurement means and/or the optical acquisition means;
   The equipment is a mobile terminal or a server, suited for communicating with the magnetic measurement means, the inertial measurement means and the optical acquisition means.

According to a third aspect, the invention relates to a system including the equipment according to the second aspect of the invention and the magnetic measurement means, the inertial measurement means and the optical acquisition means in connection.

According to a fourth and a fifth aspect, the invention relates to a computer programme product including code instructions for the execution of a method for estimating the movement of an object moving in an ambient magnetic field according to the first aspect of the invention; and a storage means readable by a computer equipment on which a computer programme product includes code instructions for the execution of a method for estimating the movement of an object moving in an environment and an ambient magnetic field according to the first aspect of the invention.

DESCRIPTION OF THE FIGURES

Other characteristics and advantages of the present invention will become clear on reading the description that follows of a preferential embodiment. This description will be given with reference to the appended drawings in which.

DETAILED DESCRIPTION

Principle

The present invention proposes adding magnetometers to VINS so as to implement additional magneto-inertial navigation techniques. More specifically, a "vision-magnetoinertial" system designated V-MINS is used, which can be seen as both a "vision-inertial" and "magneto-inertial" system. It will be recalled that magneto-inertial navigation is well known, see the document FR2914739.

It may seem counterintuitive to seek to reduce the electricity consumption of the system not by removing but by adding sensors, but it turns out that the vision aspect and the magnetic aspect are perfectly complementary and that their joint use is more economic than using the vision aspect alone.

More precisely, the vision aspect and the magnetic aspect are efficient in opposite environments: whereas indoors vision has more chance of being faulty, magnetometry is perfectly suited. Conversely, in outdoor environments, whereas the absence of magnetic gradient may hinder purely magneto-inertial navigation, vision is perfectly suited.

Various ways of best exploiting these data will be described hereafter but it will be understood that, above all, the addition of magnetometers to a VINS system provides information making it possible to carry out "dead-reckoning" in an autonomous manner, which the inertial unit alone does not allow.

Indeed, in conventional VINS systems, vision data are used to correct inertial data, i.e. carry out resetting. It will thus be understood that if the camera is switched off (for example because one is in a dark zone and when there is no longer interest in acquiring images and thus that it is better to switch off the camera to save energy) there is no longer resetting.

In the present V-MINS system, it remains possible to carry out resetting even when the camera is switched off, thanks to the magnetometric data.

This thus makes it possible to reduce the frequency necessary for camera based resetting for a same level of performance, or even to do without, over a certain time interval (in the operating domains of the magneto-inertial navigation), the camera as well as associated heavy processing operations.

Architecture

Figure 1:
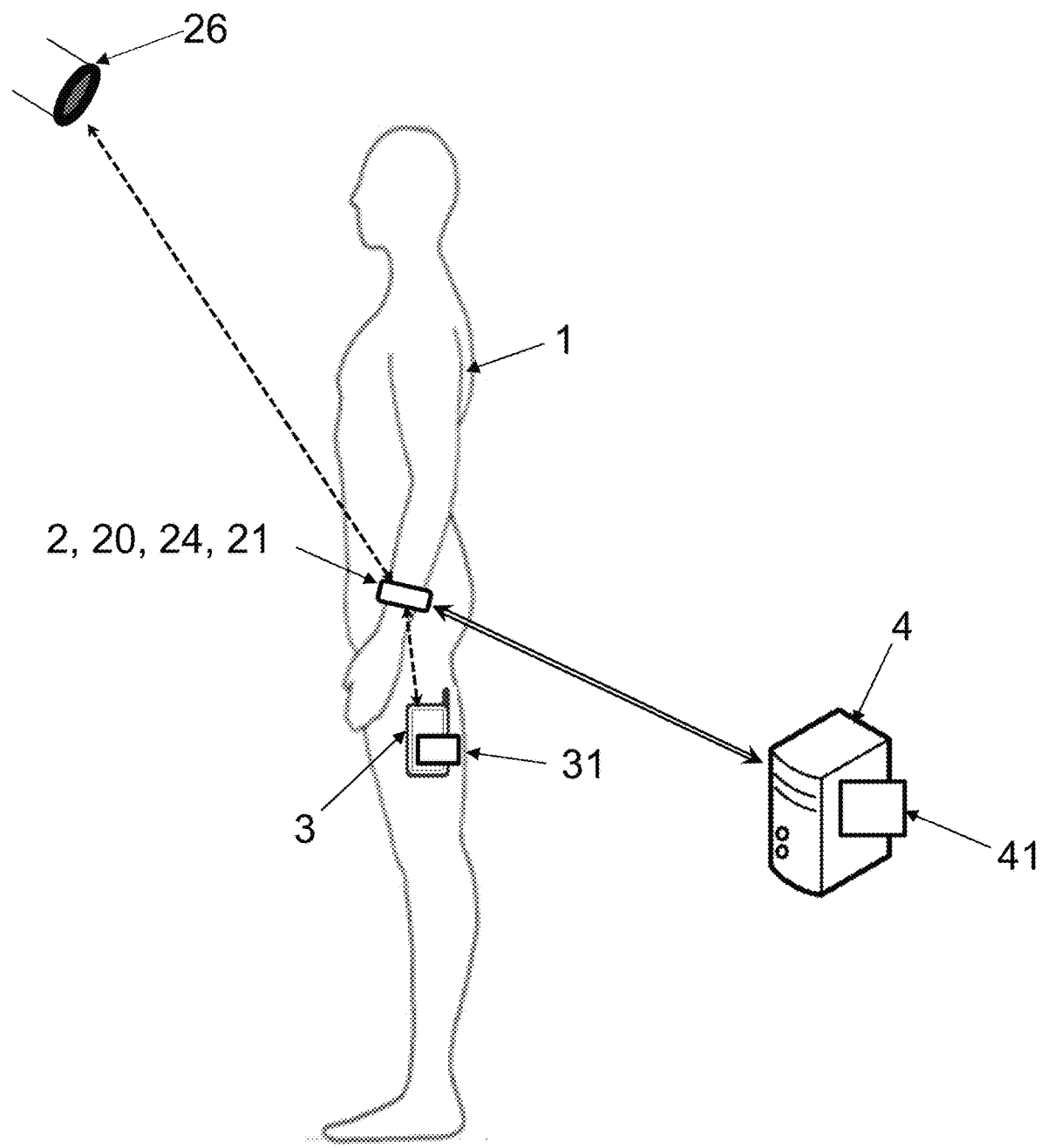
FIG. 1 is a diagram of equipment for the implementation of an alternative of the method according to the invention.

With reference to FIG. 1, the present method enables the estimation of the movement of an object 1 moving in an environment Σ and an ambient magnetic field (typically the Earth's magnetic field, which could be slightly altered by nearby metal objects or electrical currents), noted $\vec{B}$. The magnetic field is a vector field in three-dimensional space, that is to say associating a vector with three dimensions with each three-dimensional point in which the object is moveable.

This object 1 may be any moveable object of which knowledge of the position is desired, for example a wheeled vehicle, a drone, etc., but also a person or a part of the body of this person (his hands, his head, etc.).

The object 1 is equipped with magnetic measurement means 20, which are magnetometers and/or gradiometers. More precisely, instead of measuring the value of the components of the magnetic field $\vec{B}$, the latter measure directly the value of the components of the magnetic field gradient $\vec{B}$, i.e. the value of the spatial derivatives. Such magnetic gradiometers 20 are known to those skilled in the art. According to certain embodiments of the invention, gradiometers could be used to measure directly the value of the second derivatives (second order gradient), and in a general manner the i-th derivatives (i-th order gradient).

In the remainder of the description the example of magnetometers will be taken but those skilled in the art will know how to transpose it to gradiometers.

The magnetometer(s) 20 are "axial", that is to say capable of measuring a component of said magnetic field, i.e. the projection of said magnetic field vector $\vec{B}$ along their axis (or in the case of gradiometer a component of an i-th order spatial derivative of said magnetic field, i.e. the variation in a component $\nabla^{i-1}B$ at said gradiometer along their axis).

Advantageously, the magnetometers 20 are at least 3n+3 in number, advantageously organised by groups of three into "triaxes", i.e. a triplet of magnetometers 20 two by two orthogonal associated with the same spatial position and measuring the magnetic field along the three axes.

In a preferred manner, the orthonormal point of reference associated with the object is chosen by convention (and by facility for the remainder of the present description) such that the triaxes are advantageously oriented in accordance with said orthonormal point of reference, so as to further facilitate the calculations.

But those skilled in the art will know how in all cases to transpose it to any spatial arrangement of gradiometers/magnetometers.

The object 1 is also equipped with inertial measurement means 24. Such means are widely known to those skilled in the art and typically constitute an inertial unit including at least an accelerometer and/or a gyrometer, in a preferred manner three accelerometers and three gyrometers, also arranged in triaxis. The gyrometers measure the instantaneous angular velocity of the inertial unit with respect to the terrestrial reference frame, noted $\vec{\Omega}$. Accelerometers are sensitive to external forces other than gravitational applied to the sensor, and make it possible to measure an acceleration noted y.

The inertial and magnetic measurement means 20, 24 are fixed with reference to the object 1, i.e. they have a substantially identical movement in the terrestrial reference frame (it can be also said that the measurement means 20, 24 are integral with the object 1). In a preferred manner, the reference frame of the object 1 is provided with an orthonormal cartesian point of reference in which the coordinates are noted $(x_1, x_2, x_3)$, the magnetometers 20 thus have a predetermined position in this point of reference.

The system for the implementation of the method includes at least optical acquisition means 26. In a main embodiment of the invention represented in FIG. 2 (which will be taken as an example in the remainder of the present description), the optical acquisition means 26 are also fixed with reference to the object 1 (in other words they have the same movement) and observe the environment Z. To make it easier to understand the present method, the assembly formed by the object 1 and the optical acquisition means 26 will be reduced to a point, situated at the optical centre of the optical acquisition means 26. These optical acquisition means 26 may be of varied nature but preferentially consist of one or more cameras and advantageously a single camera in order to limit electrical consumption. The camera(s) may be depth cameras, but in a preferred manner a conventional camera will be used reproducing a visible image of the environment and not a depth image, and in particular a simple CCD or CMOS camera (colour or black and white) which is sufficient, less bulky and less energy consuming.

In the alternative embodiment (which will be described more specifically hereafter) and corresponds to FIG. 1, the optical acquisition means 26 are fixed with respect to the environment Σ and observe the object 1. It will be understood that the first embodiment (embedded optical acquisition means 26) is preferred, because it enables the continuous estimation of the movement of the object 1, including if it moves over long distances. In the second embodiment, one is limited to the field of vision of the optical acquisition means 2, but this is perfectly suited if one follows the movement of parts of the body of a user for example.

Figure 2:
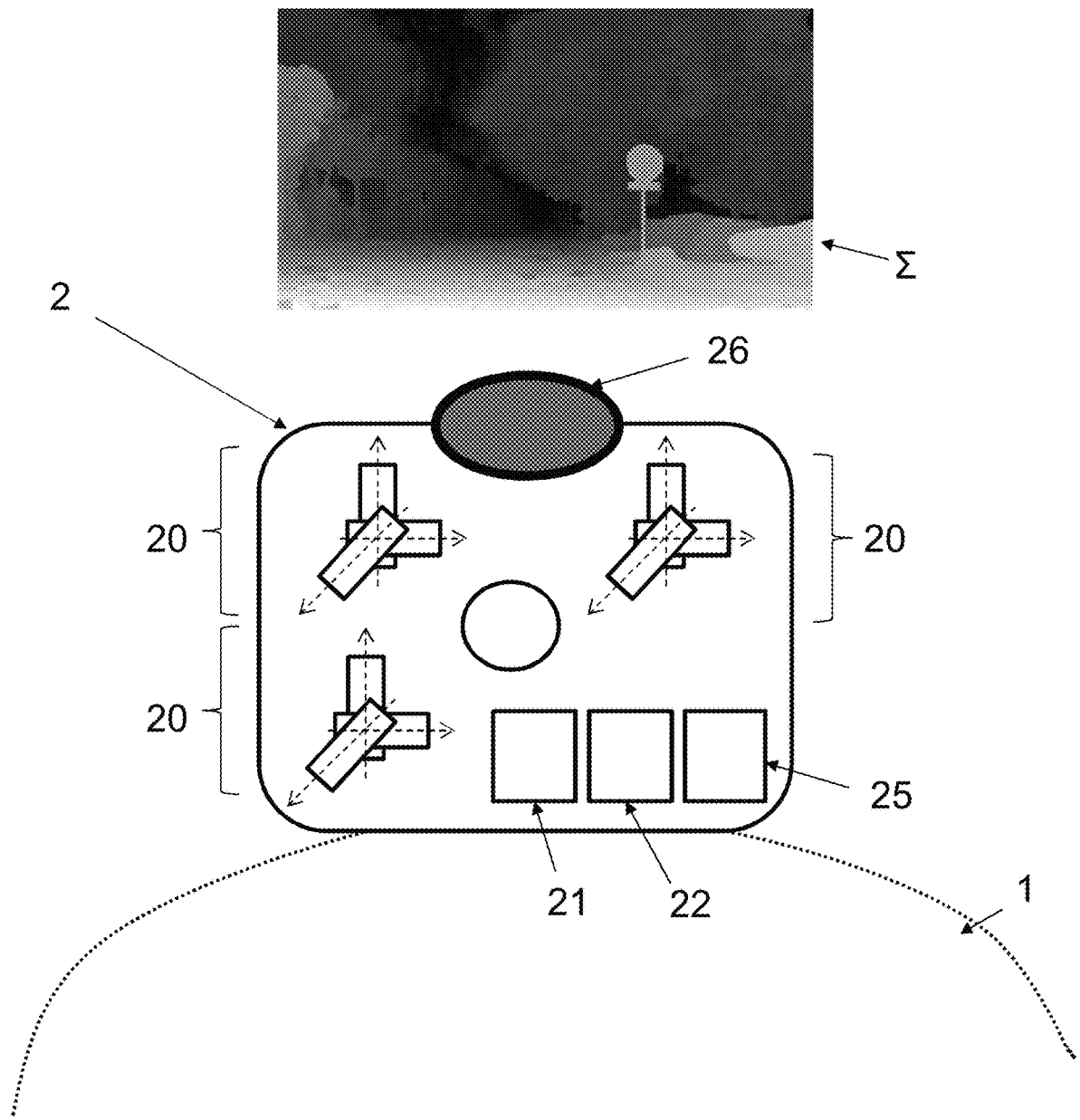
FIG. 2 represents in greater detail an example of case for the implementation of the method according to the invention according to another alternative.
Figure 3:
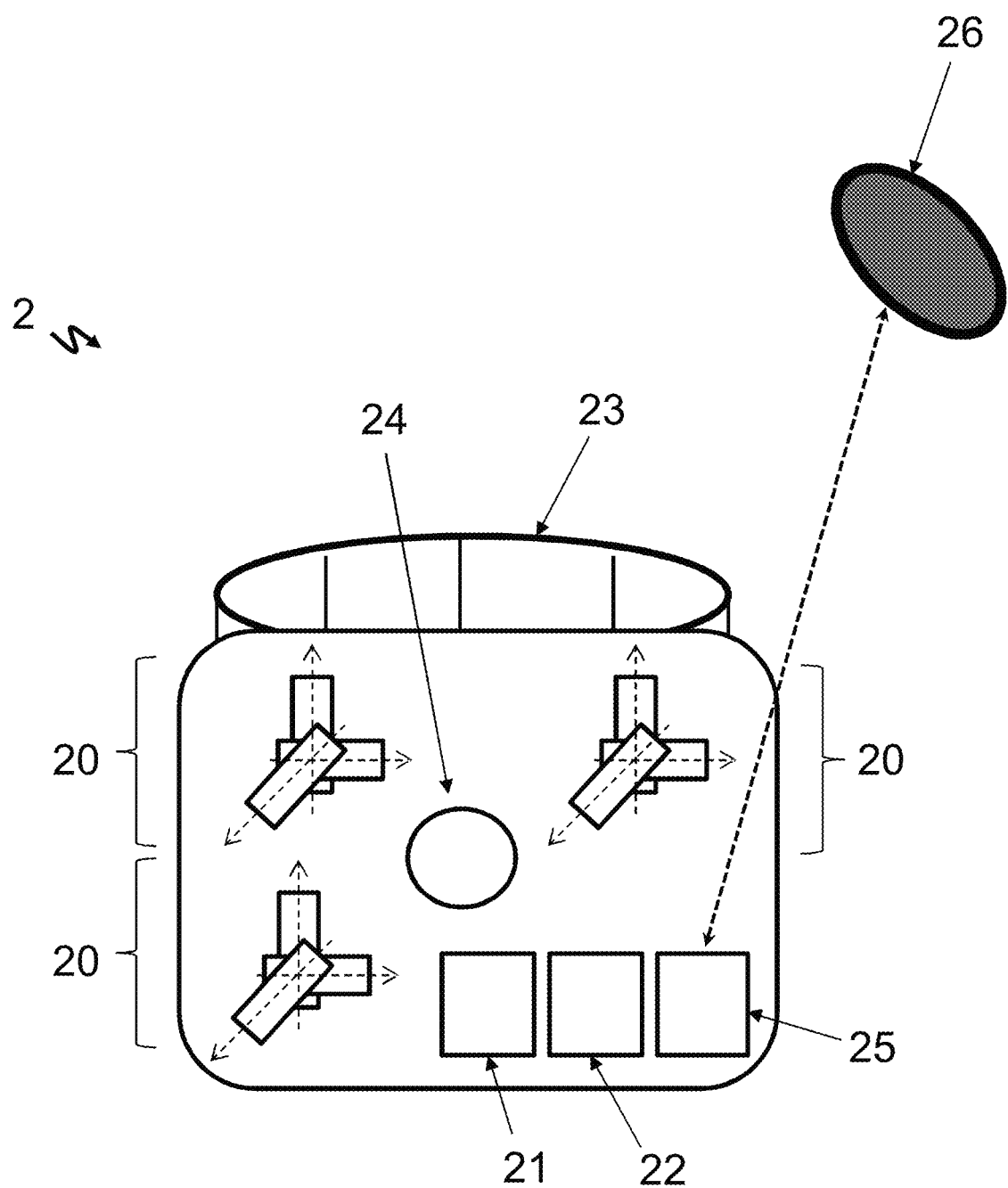
FIG. 3 represents in greater detail an example of case for the implementation of the method according to the invention according to the first alternative.

With reference to FIG. 2, the inertial and magnetic measurement means 20, 24, and if needs be the optical acquisition means 26, are preferentially those of a case 2 having means 23 of attachment to the object 1. These attachment means 23 consist for example, if the object 1 is a person, of a bracelet for example a self-gripping strap that grips the limb (for example the wrist, the hand or the head) and enable a fixed connection, see the example of FIG. 3. It will clearly be understood that the invention is not limited to the estimation of the movement of a person, but it is particularly advantageous in such a use because it enables a very reduced bulk, which is necessary so that the case is portable by a human in an ergonomic manner.

The case 2 may include processing means 21 (typically a processor) for implementing directly in real time the processing operations of the present method, or instead the measurements may be transmitted via communication means 25 to an external device such as a mobile terminal (smartphone) 3, or even a remote server 4, or instead the measurements may be recorded in local data storage memory means 22 (a flash type memory for example) for a posteriori processing for example on the server 4.

The communication means 25 may implement a short range wireless communication, for example Bluetooth or Wi-Fi (in particular in an embodiment with a mobile terminal 3) or even be means for connecting to a mobile network (typically UMTS/LTE) for a long distance communication. It should be noted that the communication means 25 may be for example a wired connection (typically USB) for transferring data from the local data storage means 22 to those of a mobile terminal 3 or a server 4.

If it is a mobile terminal 3 (respectively a server 4) that hosts the "intelligence", it includes processing means 31 (respectively 41) such as a processor for implementing the processing operations of the present method that are going to be described. When the processing means used are those 21 of the case 2, it may further include communication means 25 for transmitting the estimated position. For example, the position of the bearer may be sent to the mobile terminal 3 to display the position in a navigation software interface.

In the remainder of the present description, it will be seen that the data processing means 21, 31, 41 respectively of the case 2, a smartphone 3 and a remote server 4 may indifferently and according to the applications carry out all or part of the steps of the method.

Method

In a first step (a), the method includes the acquisition (in particular in a reference frame of the object 1) of up to three types of data:
  by the inertial measurement means 24 fixed with reference to said object 1, of at least one component:
    of the acceleration and/or
    of the angular velocity of the object 1 (preferentially three components of the angular velocity, and three components of the acceleration).
  By the magnetic measurement means 20 (the gradiometer(s)/magnetometer(s)) fixed with reference to said object 1, of a component:
    of the magnetic field and/or
    of at least one i-th derivative of said magnetic field $\vec{B}$, with one or more values i>1 (as explained, various gradiometers/magnetometers may be used so as to measure various orders of derivatives or directly the values of the magnetic field).
  by the optical acquisition means 26, i.e.:
    If they are fixed with reference to the object 1, of consecutive images of the environment Σ,
    If they are fixed with reference to the environment Σ of the object 1, of consecutive images of the object 1.

For convenience, in the remainder of the present description "inertial datum" will designate the component(s) of the acceleration and/or the angular velocity of the object 1 acquired by the inertial measurement means 24; "magnetic datum" the component(s) of the magnetic field and/or at least one i-th derivative of said magnetic field $\vec{B}$ acquired by the magnetic measurement means 20; and "vision datum" the images acquired by the optical acquisition means 26.

These data are advantageously acquired with a dt sampling (i.e. every "dt" seconds) with dt very small compared to the characteristic time of the movements of the object 1, typically 40 ms.

As will be seen hereafter, each of these quantities is not necessarily measured at each time step. More specifically, at each instant the magnetic measurement means 20 and/or the optical acquisition means 26 may be switched off so as to only acquire permanently two types of data out of three, or even only one: inertial data and, preferentially, magnetic data or vision data. It should be noted that it is already known in VINS systems to acquire images at a frequency less than the inertial data to limit consumption, but this frequency remains relatively high at the risk of having an important drift.

In a step (b), the data processing means 21, 31, 41 estimate at least one component of the movement of the object 1, in particular all the components of the linear velocity V. One or more components of the angular velocity vector Ω may also be estimated or at least verified. This estimation is carried out using the inertial datum, as well as the magnetic datum and/or the vision datum. In other words, the set of data used may vary dynamically: either inertial+magnetic, or inertial+vision, or inertial+magnetic+vision.

Different ways of estimating the movement of the object from these data will be described hereafter.

Selection of Data

It should be noted that step (a) still includes the continuous acquisition of inertial data, but the acquisition of magnetic data or vision data potentially only by intermittence. Step (a) may however alternatively include the continuous acquisition of three types of data, but not necessarily their taking into account all the time: it may be recalled that the majority of energy consumption is due to the associated heavy processing operations.

In this respect, step (a) advantageously includes the selection of the magnetic datum and/or the vision datum. As explained, it is generally not in fact necessary to have available simultaneously two data in the measurement where there is always one of the two which is valid (and usually both): outdoors, at least the vision datum will be reliable, and indoors at least the magnetic datum will be reliable.

In this respect, the selection of the magnetic datum and/or the vision datum is advantageously the consequence of a test of the validity of the magnetic datum and/or the vision datum.

It may for example be decided that one of these types of data is the type by default (the other being designated resetting datum), and it is this type of which the validity is verified. Indeed it is astutely assumed that if the default datum is not valid, then the other datum is valid. It is possible to provide that when the default datum is not reliable, either the resetting datum or the two data are selected.

For example, according to a first example (case of FIG. 2) the object 1 is a drone moving outside. It is known that the processing of vision data will always give a good result in resetting the inertial data, but that such vision data processing will be costly in energy. Yet, economising energy is crucial for a drone, which operates on batteries and only has a limited autonomy. It is then possible to define that the type of default data is the magnetic type, that is to say that in normal situations the magnetic datum is selected and used, but not the vision datum (since the energy consumption of the magnetometers is much less than that of the camera). If the validity test is not conclusive for the magnetic datum (typically in the event of magnetic disturbance), then the vision datum is instead selected to accomplish resetting.

According to a second example (case of FIG. 1), the object 1 is a virtual reality headset, with the optical acquisition means 26 observing the headset and not fixed with reference to the latter. In so far as the means 26 are not mounted on the object 1, their electricity consumption is less problematic, which is why it may then be defined that the type of default data is the vision type, that is to say that in normal situations the vision datum is selected and used, but not the magnetic datum. If the validity test is not conclusive for the vision datum (typically if the hands of the user hide the object 1), then the magnetic datum is instead selected to accomplish resetting.

Various validity tests could be implemented, and potentially combined. It could be possible to verify in an undifferentiated manner (i.e. not just to test the validity of the magnetic datum but also the vision datum) the quality of the trajectory by estimating for example a drift uncertainty, notably in the form of a cone. If the width of this cone is above a threshold, it means that the default datum is not reliable.

More specifically for the vision datum, it is possible for example to:
Verify that the images have at least a predetermined minimum number of points of interest;
Verify that the light intensity is above a threshold;
Verify that the contrast in the image is sufficient;
etc.

More specifically for the magnetic datum, one could for example:
Evaluate the stationarity of the magnetic field (see the application FR1756958);
Verify the non-uniformity of the gradient.
Etc.

It will be noted moreover that there is not necessarily evaluation of validity for the selection and that at least at certain moments both the magnetic datum and the vision datum may be selected by default independently of the validity of the data, for example at the initialisation of the method, or when the quality of the mapping declines (see later), or quite simply at the end of a certain duration.

Thus, a criterion of inter-image temporal distance may for example be taken into account to verify at least the drift of the navigation based on the inertial and magnetic data, thanks to image information, and to correct only if necessary.

If precision is the first criterion of the application, it is also possible to use the two measurements by default, and to verify periodically the coherence of two measurements with each other. The validity tests then only being carried out in the event of incoherence, to deactivate temporarily a sensor.

Estimation of Movement

As explained, in a step (b), the data processing means 21, 31, 41 estimate at least one component of the movement of the object 1, in particular all the components of the linear velocity V and/or angular velocity $\Omega$, using the inertial datum and the magnetic datum.

Numerous techniques are known for estimating one or more components of movement either using the inertial datum and the magnetic datum, or using the inertial datum and the vision datum, including techniques using the inertial datum permanently and the vision datum intermittently.

Thus, step (b) may quite simply implement a magneto-inertial navigation algorithm and a vision-inertial navigation algorithm, and to use one or the other according to the datum selected.

Alternatively, it is simple and efficient to use known vision-inertial navigation techniques and to add taking into account the magnetic datum.

For example, vision-inertial filtering methods are known, in particular of "inverse square root" type. In these filtering methods, the state is composed of the attitude of the object as well as the attitude of a set of "key images", and a change model of the filter based on inertial equations is used. It suffices to add to this filter at least one magnetic equation, such that $\dot{B}=-\Omega\wedge B+\nabla B\cdot V$, to make the filter magneto-vision-inertial.

In the absence of the magnetic datum (if only the vision datum is selected), the contribution of the magnetic equation(s) may be eliminated. And, in the absence of the vision datum (if only the magnetic datum is selected), the filter will continue to operate without problem.

Generally speaking, step (b) includes in a preferred manner a first sub-step (b1) of constructing elements for mapping the environment using the inertial datum as well as the magnetic datum and/or the vision datum, and a second sub-step (b2) of estimating the at least one component of the movement of the object 1 from said mapping elements (by locating the object 1).

The mapping elements are either the complete map, or just points of reference called "landmarks", fixed and identifiable in the environment (along the lines of lighthouses in maritime navigation).

It should be noted that these two steps are not necessarily distinct and may be carried out simultaneously. In the case where the environment is mapped, this technique is known by those skilled in the art by the name of SLAM (simultaneous localization and mapping).

In the case where there is not complete intermediate mapping but only the determination of the position of landmarks in step (b1), the technique is known by those skilled in the art under the name "visual odometry". It should be noted that the position of the landmarks may be an implicit datum of the odometry method. For example, in a case of filtering, the position of these landmarks is not always included in the state. Instead, they may be triangulated and instantaneously marginalised when the landmarks are more visible.

In both cases, step (b1) includes the construction of a mathematical representation of the environment having the information necessary for the relocation of the object 1 moving in the volume of the mapped environment, or at least provided with landmarks.

This representation may contain information derived from the optical acquisition means 26 (description of visual landmarks) or derived from magnetic measurement means 20 (map of the magnetic field and its gradient), in particular according to which is the default datum.

It should be noted that it is possible to put, in addition to visual landmarks, information on the magnetic field in the map.

A simple example could associate for each landmark the angle between the direction of the field measured when the landmarks are detected and the firing line towards the landmark. Even if the field does not give north precisely, this can facilitate re-location in a large map, since one now only has to associate the landmarks that one sees currently with the landmarks of the map that have been seen at a moment or the field was more or less aligned with the field measured currently.

A preferred embodiment of the process for constructing mapping elements of step (b1) may be described in three sub-steps being able if needs be to be executed simultaneously:

(i) The reception of inertial, magnetic and/or vision data;
(ii) The rough but efficient construction of the mapping elements, preferentially implemented uniquely with magnetic and inertial data, so as to reduce the number of images to record (the images serving mainly for reconstruction and are less important for rough location);
(iii) The refining of the mapping elements in order to correct the potential drifts of step ii (potentially executed a posteriori), in particular with the vision datum.

It may thus be seen for example that as long as the magnetic datum is reliable and selected one may remain at step ii, and implement step iii if this datum is evaluated non-reliable and non-selected.

The mapping elements necessarily contain 3D positioning information of visual landmarks: this information may be derived from a sonar optic type method (see the application WO 2011147947) or instead derived from traditional methods of "Structure From Motion" (SfM), or "Bundle Adjustment" (BA), iterative optimisation on all the data finding the 3D position of the points explaining as best as possible all the measurements. These SfM methods exist in the prior art in versions incorporating or not inertial data. It should be noted that all or part of the mapping elements may all be known a priori (in particular to initialise the method).

In practice, the exactitude and the integrity of these mapping elements is primordial, for the location phase. And SfM methods are generally necessary to obtain the final level of precision and integrity required for the application. However, these methods are cumbersome, and of which the computing time increases much more than linearly with the size of the mapping.

The basis of these SfM methods being non-linear optimisation, the quality of the initialisation of the variables of positions of the landmarks and cameras having observed them during the mapping phase is primordial for a convergence towards the good local minimum and rapid convergence.

It may be seen that the present method astutely combining the use of inertial, magnetic and vision data then makes it possible:

to reduce substantially the computing power necessary for the construction of position variables of the initialised landmarks compared to the currently used method, among which the VINS filtering methods mentioned above. These lower computing powers may stem for example from the fact that it is possible to decouple the location and triangulation part or instead from the fact that the a priori location on the basis of magnetic and inertial data makes it possible to reduce the search for a point of interest to a part of the image.

to aid the initialisation of variables (step ii) the closest to the final solution in the case where the vision is ambiguous (flat wall, dark place). This enables a more rapid convergence of the SfM algorithms.

to make more robust the initialisation of the variables of the problem of SfM vis-á-vis the type of movement made during data collection. This enables a convergence in the good local minimum of the SfM problem even if the movements made by the user, a priori non-formed, are not optimum for the reconstruction of the mapping (essential in practice, devices of the prior art for 3D reconstruction recommend avoiding pure rotation movements, which poorly condition the optimisation problem, the addition of the magnetic datum makes it possible to avoid these conditioning problems polluting the trajectory when the movement made by the user is degenerated).

Calibration

In a preferred manner, step (a) includes the prior calibration of one among the inertial measurement means 24, the magnetic measurement means 20 and the optical acquisition means 26, with the data acquired by the two others. In a preferred manner, either the optical acquisition means 26 is calibrated with the inertial datum and the magnetic datum, or the magnetic measurement means 20 with the inertial datum and the vision datum.

Indeed, in so far as there is potentially a redundancy of the information borne by the inertial datum, the magnetic datum and the vision datum when they are all three considered, it is possible to correct the parameters linked to the sensors (biases or scale factors of the magnetic measurement means 20, distance between the optical axis of the optical acquisition means 26 and measurement means 20, 24, etc.) and thus to improve the estimation of the movement in fine.

Equipment and System

According to a second aspect, the invention relates to in particular the equipment 2, 3, 4 for the implementation of one or the other of the embodiments of the method.

As explained previously, according to a first embodiment the equipment is an autonomous case 2 including the magnetic measurement means 20 and/or the inertial measurement means 24 (preferentially the magnetic measurement means 20 and the inertial measurement means 24) and the data processing means 21 configured for the implementation of the steps of the method.

The case 2 further includes means for attaching 23 the case 2, and if needs be, data storage means 22 (for the storage for example of the estimated movements) and/or communication means 25 for the exportation of the results.

Either the case 2 includes the optical acquisition means 26 (if they observe the environment), i.e. these are distinct and arranged in a fixed manner and communicate with the case 2. In this embodiment, where the case 2 contains the intelligence, one is preferentially in the situation where the case 2 also contains the optical acquisition means 26 (situation where the object 1 is for example a drone)

According to a second embodiment, the equipment is a mobile terminal 3 or a server 4, suited for communicating with the magnetic measurement means 20 and the inertial measurement means 24, and the optical acquisition means 26.

Typically, the magnetic measurement means 20 and the inertial measurement means 24 are arranged in a case 2, and the optical acquisition means 26 are arranged in a fixed manner in the environment, but it is possible to have the three means 20, 24, 26 in a same case 2, or two or even three distinct cases.

In other words, the terminal 3 or the server 4 includes the processing means 31 or 41 configured for the implementation of the steps of the method. Each case 2 may all the same include data processing means 21 for the control of the means 20, 24, 26 and the transmission (via communication means 25) of the measured data to the data processing means 31, 41.

It is to be noted that if needed the steps of the method may be divided between the means 21, 31, 41.

The invention also relates to in this case the system including the equipment 3, 4 according to this embodiment and the connected "satellite" case(s) 2.

In all cases, the data processing means 21, 31, 41 of the "main" equipment 2, 3, 4 are configured to implement:

A module for receiving:
- at least one component of an acceleration and/or an angular velocity of the object 1, designated inertial datum, acquired by inertial measurement means 24 fixed with reference to said object 1;
- at least one component of the magnetic field and/or an i-th derivative of the magnetic field, designated magnetic datum, by magnetic measurement means 20 fixed with reference to said object 1;
- consecutive images of the environment Σ or the object 1, designated vision datum, by optical acquisition means 26 respectively fixed with reference to said object 1 or the environment Σ, A module for estimating at least one component of the movement of said object 1 using the inertial datum, as well as the magnetic datum and/or the vision datum.

Computer Programme Product

According to a third and a fourth aspect, the invention relates to a computer programme product including code instructions for the execution (on the processing means 21, 31, 41) of a method for estimating the movement of an object 1 moving in an environment Σ and an ambient magnetic field according to the first aspect of the invention, as well as storage means readable by a computer equipment (for example data storage means 22) on which this computer programme product is found.

The invention claimed is:

1. Method for estimating the movement of an object moving in an environment and an ambient magnetic field, the method comprising:
    (a) Acquisition:
        By an inertial measurement unit fixed with reference to said object, of at least one component of an acceleration and/or an angular velocity of the object, designated inertial datum;
        by a magnetic measurement unit fixed with reference to said object, of at least one component of the magnetic field and/or an i-th derivative of the magnetic field, at the magnetic measurement unit, designated magnetic datum;
        by a optical acquisition unit fixed with reference to said object or the environment, of consecutive images respectively of the environment or said object, designated vision datum;
        evaluation of the validity of the magnetic datum and/or the vision datum, and selection of the magnetic datum and/or the vision datum as a function of the result of said validity evaluation;
        in which one of the magnetic datum and vision datum is a default datum and the other a resetting datum, the evaluation of the validity being implemented for the default datum, and the selected datum being:
            the default datum if the default datum is evaluated valid,
            the resetting datum if the default datum is not evaluated valid;
    (b) Estimation by a data processor of at least one component of the movement of said object using the inertial datum, as well as the datum or data selected from among the magnetic datum and the vision datum.

2. Method according to claim 1, in which the evaluation of the validity of the magnetic datum and/or the vision datum includes the evaluation of an uncertainty on the estimation of the movement.

3. Method according to claim 1, in which the evaluation of the validity of the magnetic datum includes the evaluation of the stationarity of the ambient magnetic field, or the evaluation of the non-uniformity of the gradient.

4. Method according to claim 1, in which the evaluation of the validity of the vision datum includes the evaluation of the number of points of interest, the evaluation of the light intensity, the evaluation of an indicator of the image contrast, or the evaluation of the success of the detection of the object in the image in the case where the optical acquisition unit is fixed with reference to the environment.

5. Method according to claim 1, in which said estimation includes in a preferred manner a first sub-step (b1) of constructing elements for mapping the environment using the inertial datum as well as the magnetic datum and/or the vision datum, and a second sub-step (b2) of estimating the at least one component of the movement of the object from said mapping elements.

6. Method according to claim 5, in which the first sub-step (b1) of constructing elements for mapping the environment using the inertial datum as well as the magnetic datum and/or the vision datum includes a first rough construction of elements for mapping the environment using the inertial datum as well as the magnetic datum, then refining the elements for mapping the environment using the vision datum.

7. Method according to claim 1, in which said acquisition includes the prior calibration of one among the inertial measurement unit, the magnetic measurement unit and the optical acquisition unit, with the data acquired by the two others.

8. Equipment for estimating the movement of an object moving in an environment and an ambient magnetic field, including a data processor configured to implement:
    a module for receiving:
        at least one component of an acceleration and/or an angular velocity of the object, designated inertial datum, acquired by a inertial measurement unit fixed with respect to said object;
        at least one component of the magnetic field and/or an i-th derivative of the magnetic field, designated magnetic datum, by a magnetic measurement unit fixed with respect to said object;
        consecutive images of the environment or the object, designated vision datum, by an optical acquisition unit respectively fixed with respect to said object or the environment;
    of evaluation of the validity of the magnetic datum and/or the vision datum, and selection of the magnetic datum and/or vision datum as a function of the result of said validity evaluation;

in which one of the magnetic datum and vision datum is a default datum and the other a resetting datum, the evaluation of the validity being implemented for the default datum, and the selected datum being,
the default datum if the default datum is evaluated valid,
the resetting datum if the default datum is not evaluated valid;
a module for estimating at least one component of the movement of said object using the inertial datum, as well as the datum or data selected from among the magnetic datum and the vision datum.

9. Equipment according to claim 8, being box including at least one of the magnetic measurement unit, the inertial measurement unit and the optical acquisition unit.

10. Equipment according to claim 9, being a mobile terminal or a server, for communicating with the magnetic measurement unit, the inertial measurement unit and the optical acquisition unit.

11. System including the equipment according to claim 10 and the magnetic measurement unit, the inertial measurement unit and the optical acquisition unit in connection.

12. Non-transitory computer program product including code instructions for the execution of the method for estimating the movement of an object moving in an environment and an ambient magnetic field according to claim 1, when code instructions are executed on a computer.

13. Non-transitory storage medium readable by a computer equipment, having stored thereon instructions for the execution of the method for estimating the movement of an object moving in an environment and an ambient magnetic field according to claim 1.

* * * * *